Patented Feb. 20, 1923.

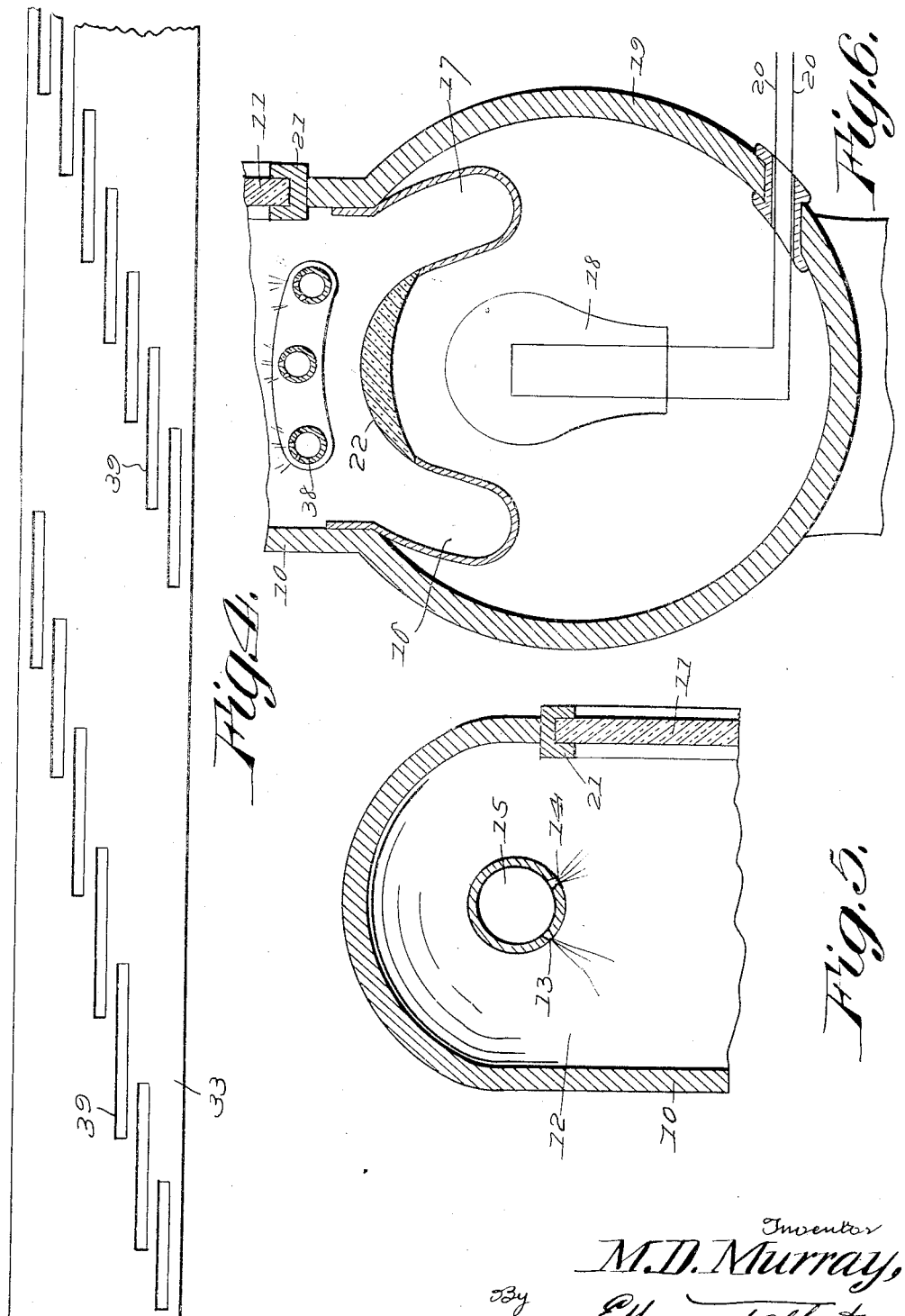

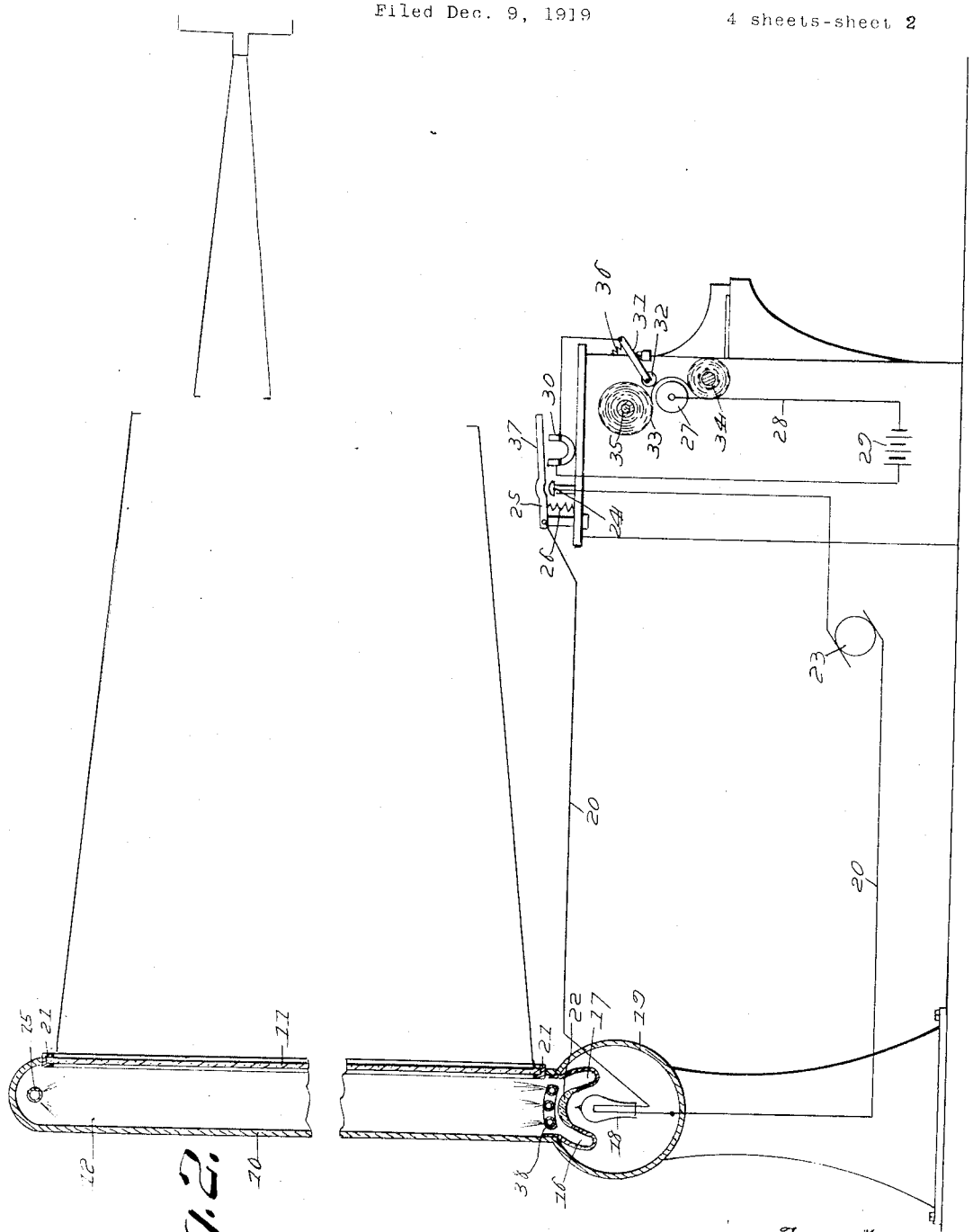

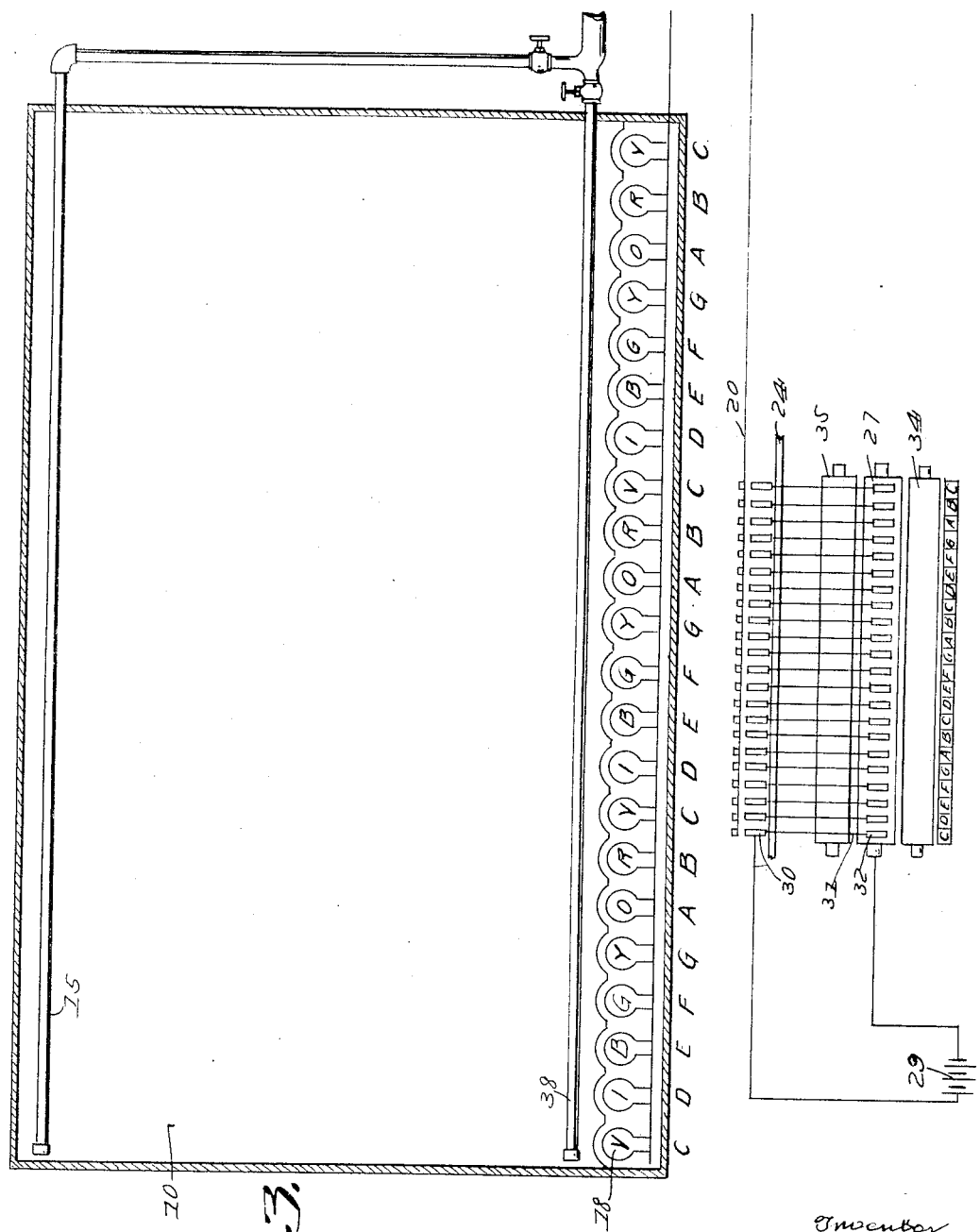

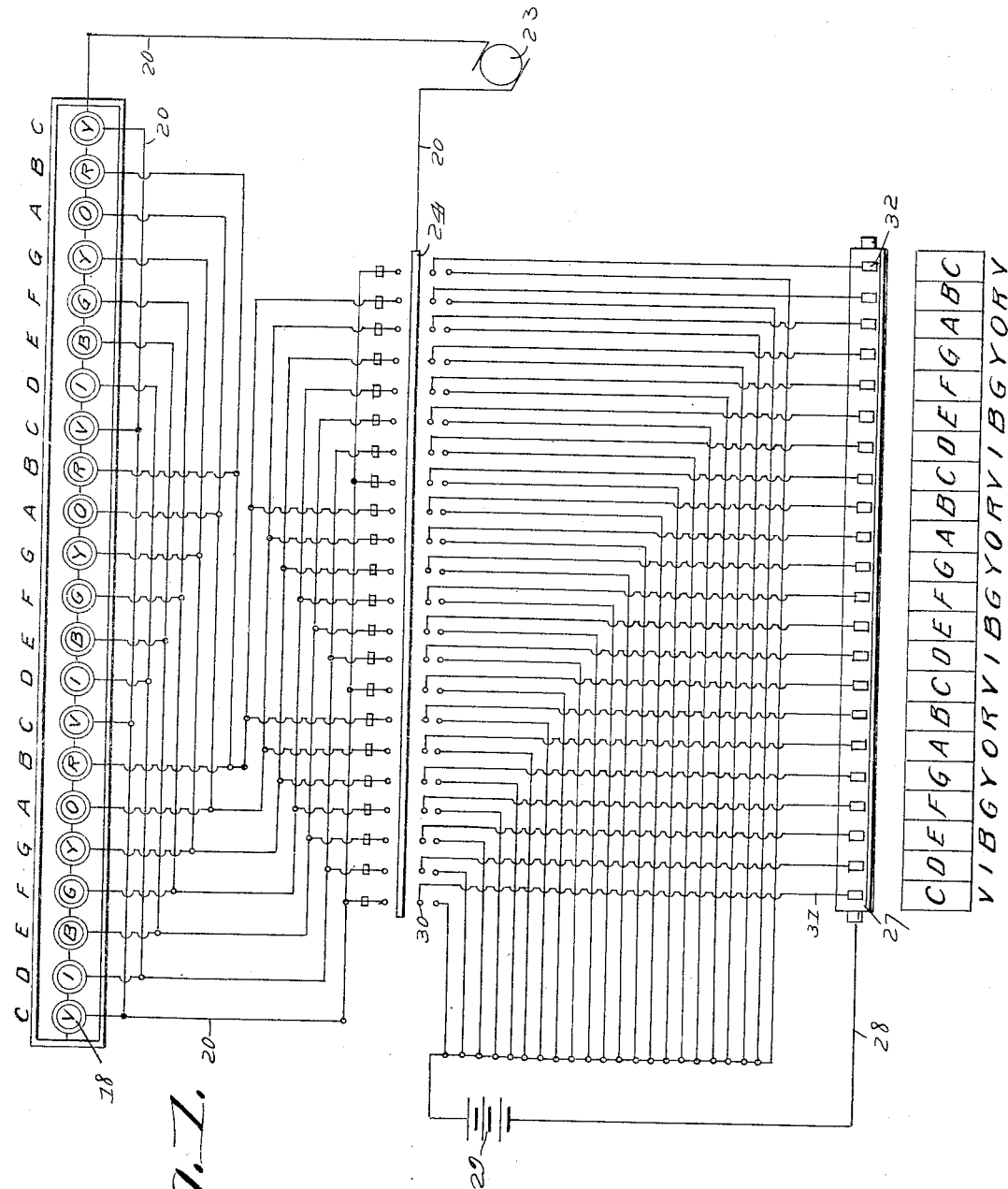

1,446,266

UNITED STATES PATENT OFFICE.

MICHAEL D. MURRAY, OF AMBRIDGE, PENNSYLVANIA.

COLORED BACKGROUND FOR MOTION PICTURES AND COLOR TONES.

Application filed December 9, 1919. Serial No. 343,482.

*To all whom it may concern:*

Be it known that MICHAEL D. MURRAY, a citizen of the United States of America, residing at Ambridge, in the county of Beaver and State of Pennsylvania, has invented new and useful Improvements in Colored Backgrounds for Motion Pictures and Color Tones, of which the following is a specification.

The object of the invention is to provide a screen or curtain for use in connection with a screen adapted for use in connection with the projection of motion pictures wherein a variety of shades and tints of color may be employed in connection with a transparent fluid film moving in a direction designed to neutralize or counteract the effect of the flicker or unsteadiness or vibration of the light tending in the progress of the film across the path of light projected through the lens to produce an upward flash or shadow or variation in the light intensity; and also to provide in connection therewith and for alternative use with relation thereto a means for displaying tone colors or a succession of prismatic or the colors of the solar spectrum, and more especially the primary and secondary colors thereof.

A further object of the invention is to provide mechanism for the purpose indicated which can be controlled mechanically through the agency of a player piano which may be used either under mechanical or manual operation to accompany and musically illustrate the scenes and topics of the picture which is being displayed upon the screen.

Further objects and advantages of the invention will appear in the course of the following description of a preferred embodiment, it being understood that changes in form, proportion and details may be resorted to within the scope of the claims without departing from the principles involved.

In the drawing:

Figure 1 is a diagram showing the system of wiring by which the lights for the screen are controlled.

Figure 2 is a vertical sectional view of the screen showing diagrammatically the lens projection of the picture thereon and the general plan of the connections whereby the variation in the lights is controlled through the mechanism of the player piano.

Figure 3 is a vertical sectional view of the screen showing in connection therewith the contact mechanism of the player piano.

Figure 4 is a plan view of a portion of a light blending sheet for controlling the modification in the color effects when the roll carrying devices of the player piano are used merely as a circuit closer and independently of the operation of the keyboard or the sound-producing mechanism of the player.

Figure 5 is a detail sectional view of the upper portion of the screen.

Figure 6 is a similar view of the lower portion thereof.

The screen proper, representing the surface upon which the pictures are projected, and which is employed in lieu of the ordinary curtain or screen surface, is indicated at 10 and preferably consists of a plate having an enameled or porcelain surface in front of which is located a plate-glass or other transparent medium 11 connected with the screen proper at the top ends and bottom to produce a chamber 12 in which may be formed a fluid curtain of water projected through outlets 13 and 14 in a water supply pipe 15 arranged longitudinally in the top of the chamber or compartment, said outlets forming jets by which the water is projected against the inner surfaces of the screen proper and the transparent interposed medium 11.

At the bottom of the chamber respectively under the inner surfaces of the screen proper and said transparent medium are arranged drainage troughs or gutters 16 and 17 adapted to lead to a suitable waste outlet, and enclosing said troughs or gutters and forming a receptacle for the incandescent or similar lamps 18 is a compartment 19 through the walls of which are carried the conductors 20 by which the said lamps are fed.

The wall of the compartment 19 may be formed as a part of the structure constituting the screen and the end and top walls of the chamber supporting the transparent medium 11, as indicated in the drawings, suitable seats 21 being provided in the casing consisting of said screen and its related parts including the wall of the chamber 19, for the reception of the edges of the transparent medium.

Spanning the interval between the drainage troughs 16 and 17 and extending over the sources of light represented by the lamps 18 there is an arched light permeable medium 22 which may either be of clear glass or may be variously colored in sections or zones and if of clear glass the globes of the light producing elements or lamps are respectively colored in accordance with the prismatic colors or colors of the spectrum as, for example, in the quarter corresponding with the degrees of the scale as represented by the whole-toned keys of an organ or piano keyboard, from the degree C to the degree B above the same, as violet, indigo, blue, green, yellow, orange and red. In practice it is preferred to employ a number of lights or color zones in the light modifying medium 22, (if the latter is depended upon to modify the colors) corresponding with three octaves or 21 or 22 degrees of the C major scale of a piano or organ keyboard, provision being made as hereinafter explained for controlling the lighting of these several colored mediums, successively or in groups, by or in accordance with the action of the keys of the intermediate three octaves of the piano or organ keyboard, or through the same means by which the actuation of said keys is effected in the usual operation of a player piano or equivalent instrument.

As one embodiment of these means the lamps constituting the units of the illuminating mechanism of the screen may be connected with the source of energy represented diagrammatically by the generator 23 (which of course may be the ordinary city lighting system) through the conductors 20 having as terminals a buss bar 24 and circuit closers 25, one of the latter being designated for each lighting unit or for a group of such units either of the same or of different colors as may be found desirable to suit the specific purpose in view, and each circuit closing element being held in circuit breaking or open position by means of a suitable spring 26 or the equivalent thereof.

The guide roll or drum 27 of the player piano or similar instrument and which should be of suitable metal, may be used as a terminal of a battery circuit consisting of the conductor 28 including a battery 29 and an electromagnet 30, while the other terminal consists of a yielding arm 31 having a contact roll 32 adapted to come into circuit closing relation with the terminal 27 through the successive perforations or air inlet openings of the record sheet or strip 33 carried by the record rolls 34 and 35. Said arm 31 may be yieldingly held in the proper position by a suitable spring 36.

In practice as the record rolls and the cylinder or drum 27 traversed by the record are rotated in the ordinary or any preferred manner the several contact elements or terminals 31 close the battery circuits through the electromagnets by contact with the terminal 27 and by energizing said magnets attract the armatures 37 forming parts of the circuit closures 25 to thereby close the light circuits and energize the units of the illuminating mechanism which in turn project the colors of the spectrum into the chamber 12 and correspondingly affect the fluid curtain which is flowing upon the surfaces of the walls of said chamber, and particularly that which traverses the inner or rear surface of the transparent medium 11, to the end that the picture which is being projected upon the screen is correspondingly affected.

This arrangement, without in any way affecting the clearness or sharpness of delineation of the picture upon the screen serves three important purposes, namely; it softens the glare or effect upon the eyes of the observer and relieves the eye strain which is incident to a close observance of a projected picture in that the lights and shadows are tempered and the uniformity of color contrasts is interrupted and relieved; second, it accentuates the natural contrasting colors of the picture on the principle that the corresponding colors thereof will absorb all except the color corresponding therewith and by rejecting the latter will intensify the effect of the same upon the eye of the observer, with the result that the colors of the picture itself and which belong to the various features or figures thereof will be emphasized and therefore reproduced with greater fidelity than under normal conditions is possible; and third, the downward movement of the film of water traversing the surface of the transparent medium will neutralize the effect of the upward flicker or flash incident to the movement of the film across the field of the projector and which is incident to the movement of the shutter or the spaces between the successive pictures or impressions on the film.

In connection with the apparatus as above described, it is also possible to upwardly project a curtain of water or similar liquid by means of jet pipes 38, of which any desired number may be employed to produce the effect of a fountain, and to illuminate the same by the means described, the variations in the colors projected thereon being controlled either by the key operating mechanism of the instrument as above described, or by employing a special roll or sheet indicated in Figure 4 wherein the several slots 39 permitting the closing of the controlling circuits by the contact of the terminals 31 with the terminal 27 provide for the display of the several colors successively, and by arranging these slots as indicated in overlapping relation a blending or melding of one into the other may be produced to give an attractive change of color tone in the reproduction of the picture.

What is claimed is:

1. The combination with a motion picture screen, of a progressively moving light penetrable fluid curtain interposed between the same and the projector to intercept the path of light from the latter, and means for producing rhythmically variable color effects in said curtain.

2. The combination with a motion picture screen of a progressively moving film of water interposed between the same and the projector to intercept the path of light from the latter, and means for producing rhythmically variable color effects in said film.

3. The combination with a motion picture screen of a curtain interposed between the same and the projector to intersect the path of light from the latter and consisting of a transparent medium traversed by a progressively moving film of light penetrable fluid, and means for producing rhythmically variable color effects in said curtain.

4. The combination with a motion picture screen of a curtain interposed between the same and the projector to intersect the path of light from the latter and consisting of a transparent medium traversed by a progressively moving film of light penetrable fluid, and means for projecting rhythmically variable beams of light into said curtain.

5. The combination with a motion picture screen of a curtain interposed between the same and the projector to intersect the path of light from the latter and consisting of a transparent medium traversed by a progressively moving film of light penetrable fluid, and means for projecting rhythmically variable blended beams of light into said curtain.

6. The combination with a motion picture screen of a curtain interposed between the same and the projector to intersect the path of light from the latter and consisting of a transparent medium traversed by a progressively moving film of light penetrable fluid, and means for projecting rhythmically variable beams of light through said curtain in a plane substantially parallel therewith.

7. The combination with a motion picture screen of a curtain interposed between the same and the projector to intersect the path of light from the latter and consisting of a transparent medium traversed by a progressively moving film of light penetrable fluid, and means for projecting rhythmically variable blended beams of light through said curtain in a plane substantially parallel therewith.

8. A motion picture screen having a transparent fluid curtain arranged in advance thereof and an illuminating mechanism consisting of a plurality of lighting units for respectively projecting prismatic colors upon said curtain, and means for respectively actuating the units of said mechanism in rhythmic synchronism with a musical accompaniment.

9. A motion picture screen having a transparent fluid curtain arranged in advance thereof, and an illuminating mechanism consisting of a plurality of lighting units for respectively projecting prismatic colors upon said curtain in a direction substantially parallel with the plane thereof, and means for respectively actuating the units of said mechanism in rhythmic synchronism with a musical accompaniment.

10. The combination with a motion picture screen of a curtain interposed between the same and the projector to intersect the path of light from the latter and consisting of a transparent medium traversed by a progressively moving film of light penetrable fluid, and means for projecting rhythmically variable beams of prismatic colors in a plane substantially parallel with that of the curtain and in a direction opposed to that of the movement of said film.

11. A motion picture screen consisting of a casing provided with a transparent front wall intercepting the path of light from the motion picture projector to the screen surface, means for projecting jets of water between the planes of said transparent medium and the screen surface, illuminating means disposed to project light in a plane between said transparent medium and the screen surface and having light units respectively representing the prismatic colors, and means for respectively actuating said units.

12. A motion picture screen having an interposed liquid curtain, an illuminating device having lamp units disposed in series adjacent to the plane of said liquid curtain and respectively representing prismatic colors, and means for actuating said lamp units consisting of circuits respectively including the same with a source of energy and circuit closing means including elements respectively in circuit with said lamp units and consisting of armatures, and means for controlling the circuit closures consisting of circuits including a source of energy and having as terminals a cylinder or drum and contact elements for engagement therewith, and a record sheet or strip traversing said cylinder or drum and interposed between the same and the switch elements and provided with openings to permit of periodic contact of the latter with the former.

13. Means for producing a rhythmic modification of color tones and effects on a motion picture screen which consists in a liquid curtain interposed between the screen and the picture projector, and an illuminating mechanism having light projecting units respectively representing prismatic colors to impinge upon said curtain, in combination with a circuit closing mechanism for controlling the actuation of said light projecting units, said circuit closing mechanism being actuable by the record roll of a player piano in correspondence with the tonal reproductions of the latter.

In testimony whereof he affixes his signature.

MICHAEL D. MURRAY.